United States Patent [19]
Onogi

[11] Patent Number: 6,120,400
[45] Date of Patent: Sep. 19, 2000

[54] TRANSMISSION WHEEL PRESSURIZING APPARATUS FOR TRANSMITTING CONSTANT POWER IN A VARIABLE SPEED TRANSMISSION

[75] Inventor: Kenkichi Onogi, Tokyo, Japan

[73] Assignee: Tokyo Automatic Machinery Co, Ltd, Tokyo, Japan

[21] Appl. No.: 09/231,840

[22] Filed: Jan. 15, 1999

[30] Foreign Application Priority Data

Jan. 26, 1998 [JP] Japan .................................. 10-048479
Oct. 7, 1998 [JP] Japan .................................. 10-321246

[51] Int. Cl.$^7$ ...................................................... F16H 9/18
[52] U.S. Cl. ................................................. 474/46; 474/30
[58] Field of Search .................................. 474/46, 29, 30, 474/31, 11, 28, 37, 39

[56] References Cited

U.S. PATENT DOCUMENTS

| | | | |
|---|---|---|---|
| 2,205,975 | 6/1940 | Heyer ........................................ | 474/29 |
| 2,742,794 | 4/1956 | Vogelsang ................................. | 474/29 |
| 3,386,299 | 6/1968 | Brown et al. ............................. | 474/29 |
| 3,924,480 | 12/1975 | Carapellucci ........................ | 474/29 X |
| 4,735,598 | 4/1988 | Moroto et al. ............................ | 474/29 |
| 4,973,288 | 11/1990 | Sakakibara et al. ........................ | 474/8 |

FOREIGN PATENT DOCUMENTS 9217819  8/1997  Japan .

*Primary Examiner*—Charles A. Marmor
*Assistant Examiner*—Ankur Parekh
*Attorney, Agent, or Firm*—Rothwell, Figg, Ernst & Manbeck

[57] ABSTRACT

A transmission wheel pressurizing apparatus for always supplying, in a continuously variable transmission of a constant HP transmission type, a pressurizing force and an elastic force to one out of two transmission wheels simultaneously and only a pressurizing force to the other. For securing the desired number of revolutions and axial torque by always applying a variable pressurizing force and an elastic force of the former, an indirect pressurizing system by way of an elastic member is employed. Upon giving pressurizing control to driven transmission wheel, an elastic device and a compression device are combined so that respective pressurizing forces are superposed in series one another, and the pressurizing force to the driven transmission wheel and the number of revolutions of the transmission wheel are made in inverse proportion to one another to realize pressurizing characteristics of negative inclination. Further, the elastic force thereof is always maintained to secure automatic aligning function and stable constant HP transmission to the transmission member, and apparatuses are supported in a floating state for maintaining the elastic force thus minimizing in size, and intensifying for arranging concentratively on the main body, and the entire pressurizing apparatus is made to be in a detachable construction and at the same time, achieving the high-speed responsiveness of variable speed control.

39 Claims, 7 Drawing Sheets

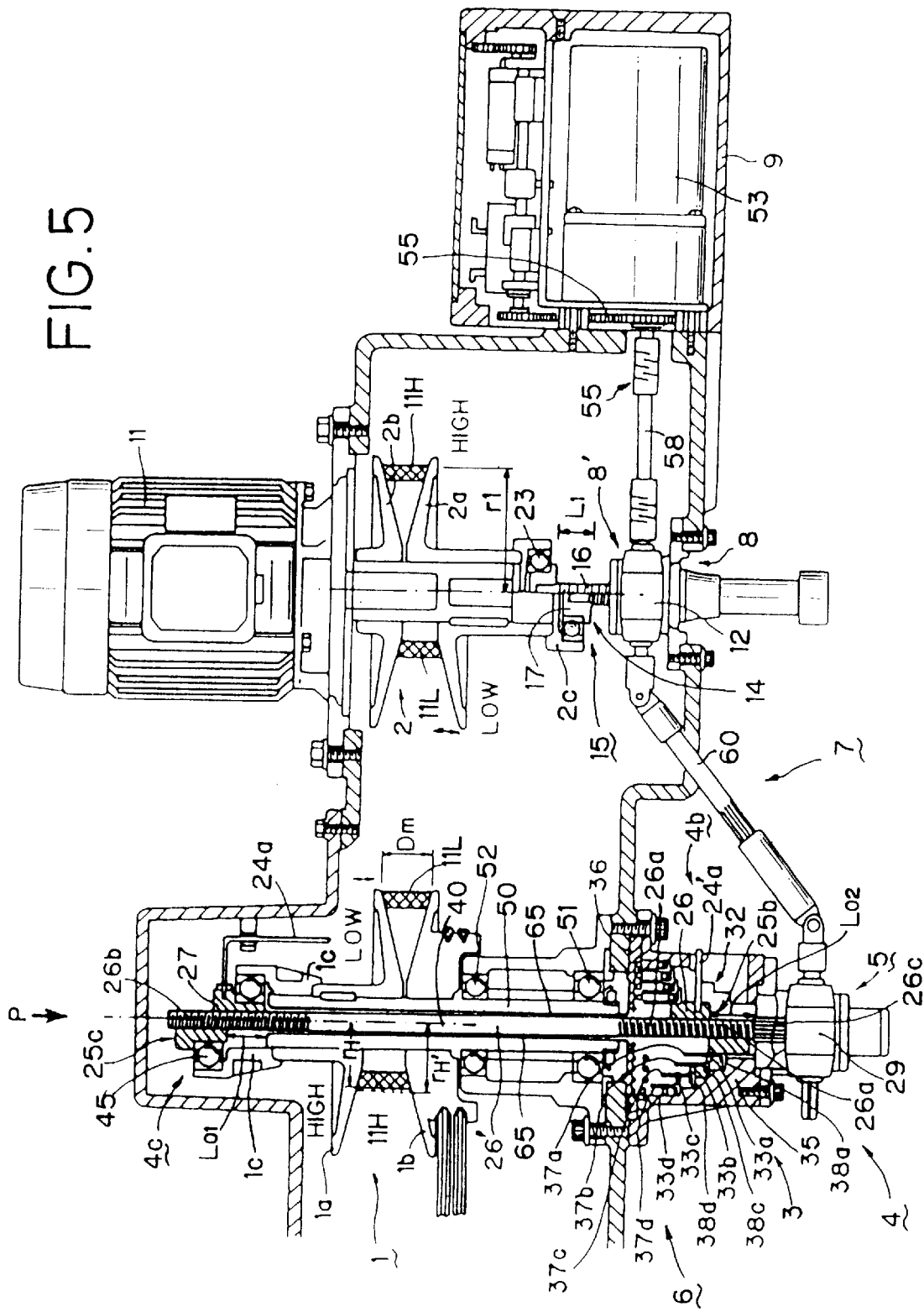

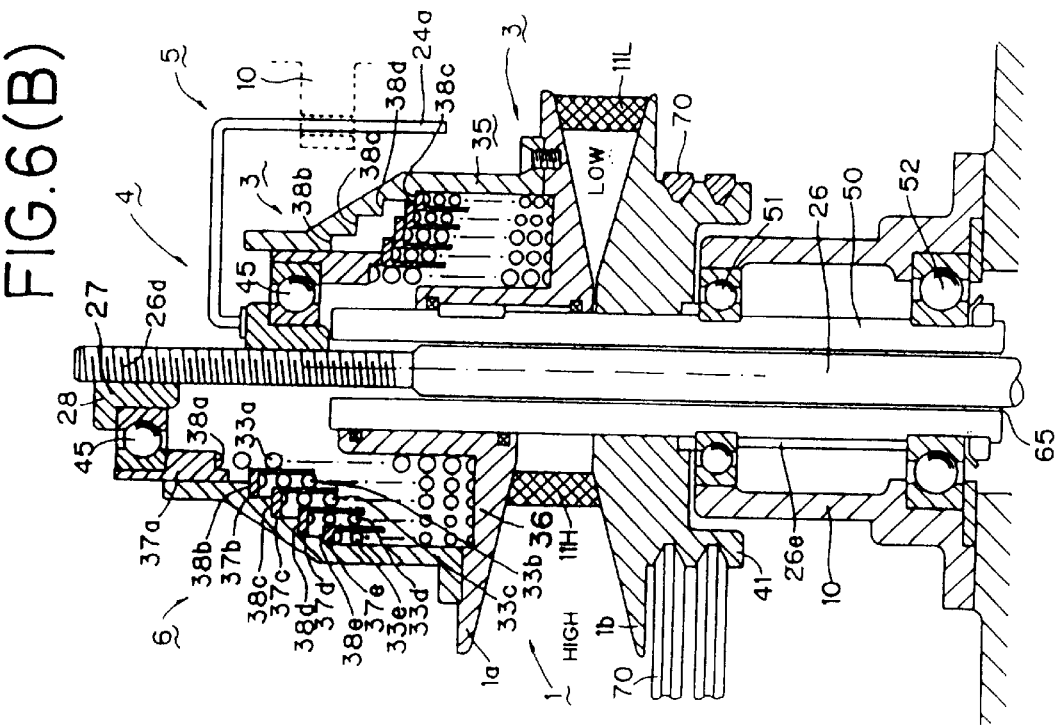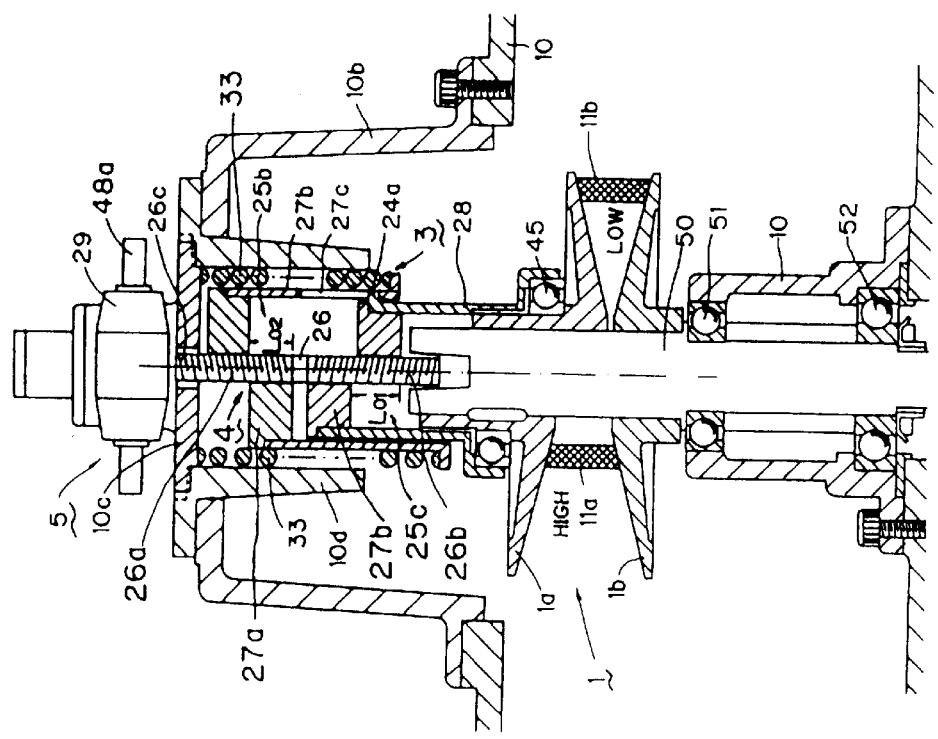

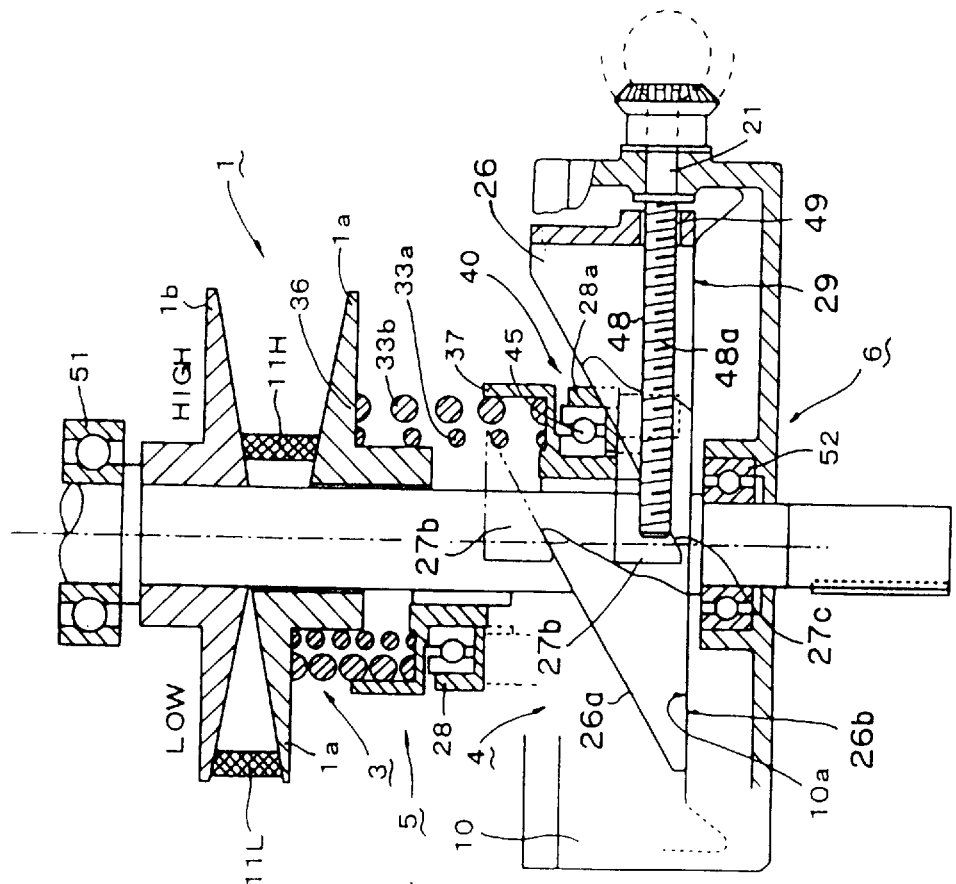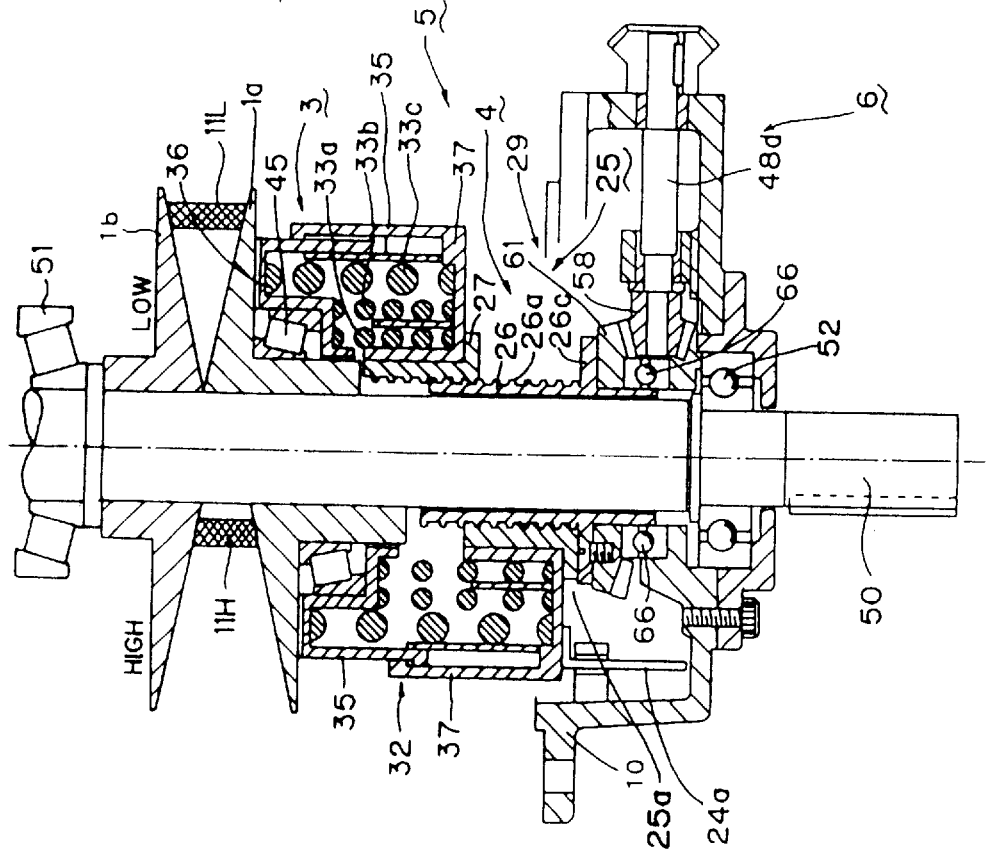

TRANSMISSION WHEEL PRESSURIZING APPARATUS FOR TRANSMITTING CONSTANT POWER IN A VARIABLE SPEED TRANSMISSION

BACKGROUND OF THE INVENTION

1. Field of the Invention

The present invention relates to a transmission wheel pressurizing apparatus, in which a pressurizing apparatus of applying to two transmission wheels of a continuously variable speed drive of a constant horsepower transmission type used for industrial machinery such as machine tools, vehicles, motors and the like, wherein both functions of constant horsepower type press control and automatic aligning are assured while stabilizing frictional transmission, and as a result, high-speed response controllability and high efficiency operation are achieved to realize a continuously variable speed drive of high quality and high respectability.

2. Description of the Prior Art

A transmission wheel pressurizing apparatus is well known from Japanese Patent Application Laid-Open No. Hei. 9-217819 (applicant: Van Doorne's Transmissie b. v.). This is a pressurizing apparatus in which out of two disks, a sliding disk itself constitutes, as a pressurizing apparatus, a part of a hydraulically driven piston cylinder, and the disk is directly pressed and slidably moved to change the radius of a transmission wheel and a transmission member to change speed. The direct pressurizing apparatus using oil pressure includes two merits, (1) a suitable pressurizing force from high to low is obtained in a narrow space, and (2) a bearing as a consumable article is not necessary. However, hydraulic control has the following two fatal and decisive defects of a variable speed drive, (1) since the oil pressure has no elasticity, when the transmission wheel is directly pressed, elasticity absorption and automatic aligning function cannot be secured with respect to shocks, errors or the like, and (2) the hydraulic medium is directly affected by delay in operation, oil leakage, centrifugal force or the like so that most fundamental transmission operation is always unstable.

Horsepower P normally transmitted to a load apparatus by a transmission wheel 1 is represented by the following equation in a relation between the number of revolutions N and the torque T:

$$P[W]=1,027 \times N[rpm] \times T[kgm]$$

Accordingly, it is necessary for transmitting fixed horsepower P0 to reduce the torque T of a transmission member when the number of revolutions N increases, and to increase the torque T when the number of revolutions N reduces conversely.

In the aforementioned related art, an elastic means such as a spring is juxtaposed on the disk of a follower transmission wheel. A compression pressurizing force supplied to a sliding disk by the elastic means increases in pressure as a high-speed rotational state assumes, while it decreases in pressure as a low speed rotational state assumes. Originally, in the constant horsepower transmission type speed variator, despite that an applied pressurizing force need be increased as the lower speed rotation assumes, the direction of the compression pressurizing force of the elastic means is exactly reverse. Accordingly, in the pressurizing apparatus of elastic means of this kind, constant horsepower transmission cannot be realized in principle.

According to the present invention, when the transmission wheel is press controlled, a pressurizing force and an elastic force are always simultaneously applied to one of two transmission wheels, and only the pressurizing force is always applied to the other. The pressurizing system of the former for always simultaneously applying the pressurizing force and the elastic force together is proposed as leading common measures. First, this does not depend on the direct pressurizing system using oil pressure; the former employs an indirect pressurizing system using an elastic member for the constant horsepower type pressurizing control while the latter employs a sliding device free from disturbance of the value of a pressed pressurizing force due to the elasticity, unstable pressure or the like, for realization of intended object. Secondly, a huge elastic member having an extremely large elastic force is indispensable, and problems created by it such as a problem of a centrifugal force of respective members and apparatuses, of an installation in a narrow space, and of an operatabilities such as assembly and disassembly are to be solved.

As the first measures, a normal elastic member of positive characteristic which increases a pressurizing force as a displacement amount of compression increases is used. A compression device is combined with the elastic device with pressurizing forces superposed in series with each other whereby the pressurizing force applied to the transmission wheel causes the relation with the number of revolutions of the transmission wheel to be in inverse proportion to each other to realize the negatively inclined pressurizing characteristic to assure the pressurizing control of fixed horsepower transmission and assure the simultaneous and constant application of not only the pressurizing force but also the elastic force to the transmission wheel and the elastic device.

As the second measures, the elastic device and the compression device are combined to secure the operative connection between the transmission wheel and the elastic device to thereby allow them the constant delivery and reception of not only the variable press control pressurizing force but also the elastic force of the elastic device for the transmission wheel.

For operating a large elastic, there is required a compression device providing a large pressurizing force, therefore. As the third measures, the compression device released from bad influence such as a centrifugal force resulting from rotation, and the periphery of the transmission wheel arranged in the narrow space is kept from cumbersome operating apparatuses as much as possible to constitute a simple control mechanism so as to always supply normal variable press control.

As the fourth measures, in the continuously variable speed drive, it is required that a first part for performing the desired shaft torque transmission and a second part for performing the speed change transmission of the accurate and desired number of revolutions need to function simultaneously; therefore, the first part and the second part are allotted to a first driven transmission wheel and a second driving transmission wheel, respectively, and a first pressurizing apparatus for performing the first part to the first driven wheel and a second pressurizing apparatus for performing the second part to the second driving wheel are separately applied to whereby the constant horsepower pressurizing transmission function and the number of revolutions variable speed function are accomplished in association with each other and simultaneously, as a consequence of which the high-speed response and the high efficiency of variable speed control section are secured.

As the fifth measures, in realizing the aforementioned first to fourth problems, it is actually indispensable upon mounting how the presence of the elastic member of maximum dimension and maximum weight is miniaturized to enhance the simplicity in handling. The elastic member having a large spring constant produces a deformation and deterioration phenomenon early, and therefore, there is provided a transmission wheel pressurizing apparatus which enhances a small storing property for one or more elastic members having a small spring constant in order to avoid the deterioration of a compression pressurizing force, and a workability of assembly and disassembly of a variable speed drive itself.

As the sixth measures, a maximum elastic material is finely divided into a number of elastic members, and there is constituted into inverse proportional pressurizing characteristics of small and acute inclination having negative inclination wide in dynamic range in which the number of revolutions/pressurizing force characteristics applied to the transmission wheel by the pressurizing apparatus is hard to be secured by a single elastic member, consequentially, there is provided a transmission wheel pressurizing apparatus which realizes high efficient transmission in a variable speed transmission section.

SUMMARY OF THE INVENTION

The means for solving a problem common to the present invention is to apply a pressurizing force of a pressurizing apparatus comprising an elastic device, a compression device and the like to and between a transmission wheel and a body to realize a constant horsepower type pressurizing apparatus.

A first means for solving a problem comprises a transmission wheel pressurizing apparatus, in which pressurizing forces of an elastic device and a compression device are superposed in series, so that a pressurizing force to a transmission wheel is controlled to a change in the number of revolutions of the transmission wheel in substantially inverse proportional, whereby the transmission wheel is variably press controlled in response to speed change instructions, thus assuring application of a constant variable pressurizing force as well as application of a constant elastic force only between the transmission wheel and the elastic device.

A second means for solving a problem is to mount either an elastic device or a compression device on a body in a rotational or non-rotational state while the other is supported in a floating state to always assure a supply of an elastic force to a transmission wheel through the elastic device or the compression device mounted in a floating state.

A third means for solving a problem is to secure an elastic device or/and a compression device in a non-rotational state at a suitable position of a body in coaxial or non-coaxial with a transmission wheel to always assure a simultaneous supply of a pressurizing force and an elastic force to the transmission wheel with a pressure transmission device disposed between the transmission wheel and the like.

A fourth means for solving a problem is that in applying a first pressurizing apparatus associated with a first transmission wheel and a second pressurizing apparatus associated with a second transmission wheel; in the former, an elastic device and a compression device are combined to simultaneously supply a variable pressurizing force and an elastic force to perform a delivery of a variable shaft torque and an automatic aligning, and in the latter, an elastic member is not intervened but only a sliding device is dared to be applied to assure a reference positioning at the speed change time of the number of revolutions to perform control on variable number of revolutions, thus applying a driving source for synchronously operating both the first and second pressurizing apparatuses in accordance with the variable speed instructions.

A fifth means for solving a problem provides a transmission wheel pressurizing apparatus having a single case for housing an elastic member in a pressurizing state in advance, in which an elastic device causes the elastic member to be movable in a compression direction within a range of maximum compression pressurizing force to minimum compression pressurizing force and a stop device for holding it in a compression pressurizing state at a predetermined fixed pressurizing value is applied to thereby render detachable while keeping a pressure storing state in the case A sixth means for solving a problem provides a transmission wheel pressurizing apparatus having a sliding member caused to be compressed and displaced successively, and a single case for storing a plurality of elastic members in a pressurizing state in advance, in which in an elastic device, each of said elastic members successively compresses and biases in response to a displacement of the sliding member in a region of movement in a compression direction so that an abutting portion with difference in level is given to the sliding member also used as the case or/and a sliding tool of a compression device, and compression pressurizing forces of the elastic members are parallel added in order determined in the abutting portion with difference in level.

The present invention can be applied, since the continuously variable speed transmission system of a constant horsepower transmission type is reviewed from the fundamental principle, to not only dry type variable speed drive but also to wet type variable speed drive, and can be also applied to the field of utilization from a small horsepower of a machine tool or the like to a large horsepower of a vehicle or the like. Particularly, in carrying out variable press control for a first (driven) transmission wheel, the present invention does not depend on a direct pressurizing system using oil pressure, but depends on an indirect pressurizing system using an elastic member whereby finally, not only constant application of variable pressurizing force, but also constant application of elastic force will suffice to be realized. Out of a combination of an elastic device and a compression device, the compression device may be either winding sliding device or a hydraulic sliding device. Even where a sliding disk of a transmission wheel directly constitutes a portion of a hydraulic cylinder, it will be an indirect pressurizing system as long as an elastic force is present in the sliding disk, and as a result, the elastic force will suffice to be always present in the sliding disk of the transmission wheel, which is therefore in the scope of the present invention. Where the compression device comprises a winding mechanism, the pressurizing force of the winding device is a mere reaction from the elastic device, and the elastic device itself is a good variable pressurizing mechanism. Further, as long as the winding device is used, it shall be a problem on the side of a driving source whether it employs electrically driven or hydraulically driven. The present invention may employ either one. The driving system of the winding mechanism of the former is superior to the other because it can follow, at high-speeds, an alternate frequent switching between increase and decrease in speed of variable speed instructions.

The elastic member is not limited to a coil spring but other forms such as a plate spring, a spiral spring or the like can be used. Even a single spring can be used, however, it is necessary to increase a spring constant in order to obtain a great pressurizing force. Further, since deformed contraction of a spring is liable to occur and dimension and shape are considerably enlarged, this can be divided into a plurality of elastic members. A plurality of plate springs may be combined in series or in parallel. The arranging direction of the elastic members need not to be limited to a concentric circle. If a small in size and a great pressurizing force can be secured, a plurality of springs may be juxtaposed and simultaneously driven to obtain a continuous linear characteristic; in addition, they may be driven stepwise in order to increase a safety rate at a portion of a variable speed region in accordance with variable speed instructions of a pressurizing apparatus to provide a discontinuous stairway characteristic; and further a continuous curve characteristic may also be employed.

Further, since a compression pressurizing force of a pressurizing apparatus may be applied between a transmission wheel and a body, the mutual arranging order and installation position of an elastic device and a compression device can be suitably changed according to the design. Where these are placed in a non-rotational state in terms of operation, a rotation separating bearing may be disposed in which way between a transmission wheel, a compression device, an elastic device and a body. The mounting place of the elastic device and the compression device need not be always disposed at a position coaxial with a transmission wheel rotational shaft but they can be installed at a suitable position on the body which is a non-coaxial position and connected to the transmission wheel by pressure transmission device. The body or the body reference surface termed herein is a place where a relative reference and/or position in an axial direction with respect to the transmission wheel is not changed irrespective of presence of rotation. It is noted that when a pressurizing direction of an elastic member and a pressurizing direction to a transmission wheel are reversed to each other, the pressurizing directions may be inverted by a lever mechanism like a seesaw. The pressure transmission device is the device for transmitting pressure or power, but any construction can be employed if the installation position of the first or second pressurizing apparatus is remote-arranged from the periphery of the transmission wheel and the pressurizing force transmission and the elastic force transmission can be carried out mutually by them. The construction is not limited to the case where two transmission levers are used, but a rigid link mechanism may be also used. It is noted that a body and a lid described in the present embodiment may be expressed by a first and a second body. Since the lid has a meaning of a second body relative to the body, which is not limited merely to the form of the storing support in each embodiment.

A motion applying member and a motion receiving member of the elastic device, and a motion applying tool and a motion receiving tool of the compression device respectively have functions equal to each other, and merely comprise a relation of the face and the back. While in the present specification, connections of both elastic and compression devices are provisionally expressed by the motion applying member and motion applying tool, it is to be noted that they can be termed as a sliding member and a sliding tool respectively. Other than the motion applying member, the motion applying tool, the motion receiving member and the motion receiving tool, the members including the pressure transmission device, the motion applying device or the like can be, depending on the design, used in common or shared with a single member, or finely divided, or reversed or replaced with members such as the disk of the transmission wheel, the body and the like, thus enabling various selections. However, these changes merely remain in a range of selected design of the members, and suitable changes made are included in the scope of the present invention.

Where the compression device comprises a winding sliding device, screw means is the most general for a winding mechanism, but even a rotary cam with a cam applied to a circumferential surface achieves a function equal thereto. It is necessary for the winding mechanism to correspond with the variable speed instructions in a relation of 1 to 1, and a well known self-lock function, i.e., a reversal rotation preventing brake function and an overrun preventing function based on a control motor are necessary in the winding mechanism. Accordingly, a composite combination of various known arts or transmission preventing means should be taken into consideration such as a combination of a trapezoidal screw and a worm transmission, or a combination of an ordinary screw or a ball screw and a motor with a brake or a clutch, an installation of a clutch on a path for variable speed instructions transmission system, and a use of a reversal rotation preventing step motor and the like. Conversely, a worm transmission that can be shared by pressurizing apparatus of a driving wheel and a driven wheel may be shared. A pressurizing moving amount of the compression device required is the sum L0 (=L01+L02) of a speed change moving portion L01 of the first transmission wheel and a pressurizing moving portion L02 of the elastic device. Accordingly, the speed change moving portion L01 and the pressurizing moving portion L02 can be constituted by separate winding mechanisms. Since the moving portion L0 on the driven wheel side is inevitably different in the operating direction and the operating amount from the moving portion L1 on the driving wheel, known elements such as a pitch, a rotating direction, the number of revolutions of the screw means of the winding mechanism, a processing direction (right threads, left threads) of threaded groove, a speed ratio of the transmission and the like can be selected depending on the design. Accordingly, while in the first embodiment, a sliding device applied to the winding screw means is constituted by threads reversed to each other by the driving and driven operating units, the threaded groove in the same direction can be employed according to a supply method from a driving source.

BRIEF DESCRIPTION OF THE DRAWING

FIG. 5 is a sectional view of a continuously variable speed drive for machine tool to which a second embodiment of the present invention is applied;

FIGS. 6A and 6B show a pressurizing apparatus applied to a transmission wheel supported by bearings into overhung holding structure, FIG. 6A and 6B being a sectional view of the apparatus according to a third embodiment of the present invention and a sectional view of the apparatus according to a fourth embodiment of the present invention respectively; and FIGS. 7A and 7B show a pressurizing apparatus applied to a transmission wheel supported by bearings on both sides of a rotary shaft, FIG. 7A and 7B being a sectional view of the apparatus according to a fifth embodiment of the present invention and a sectional view of the apparatus according to a sixth embodiment of the present invention respectively.

Figure 1:
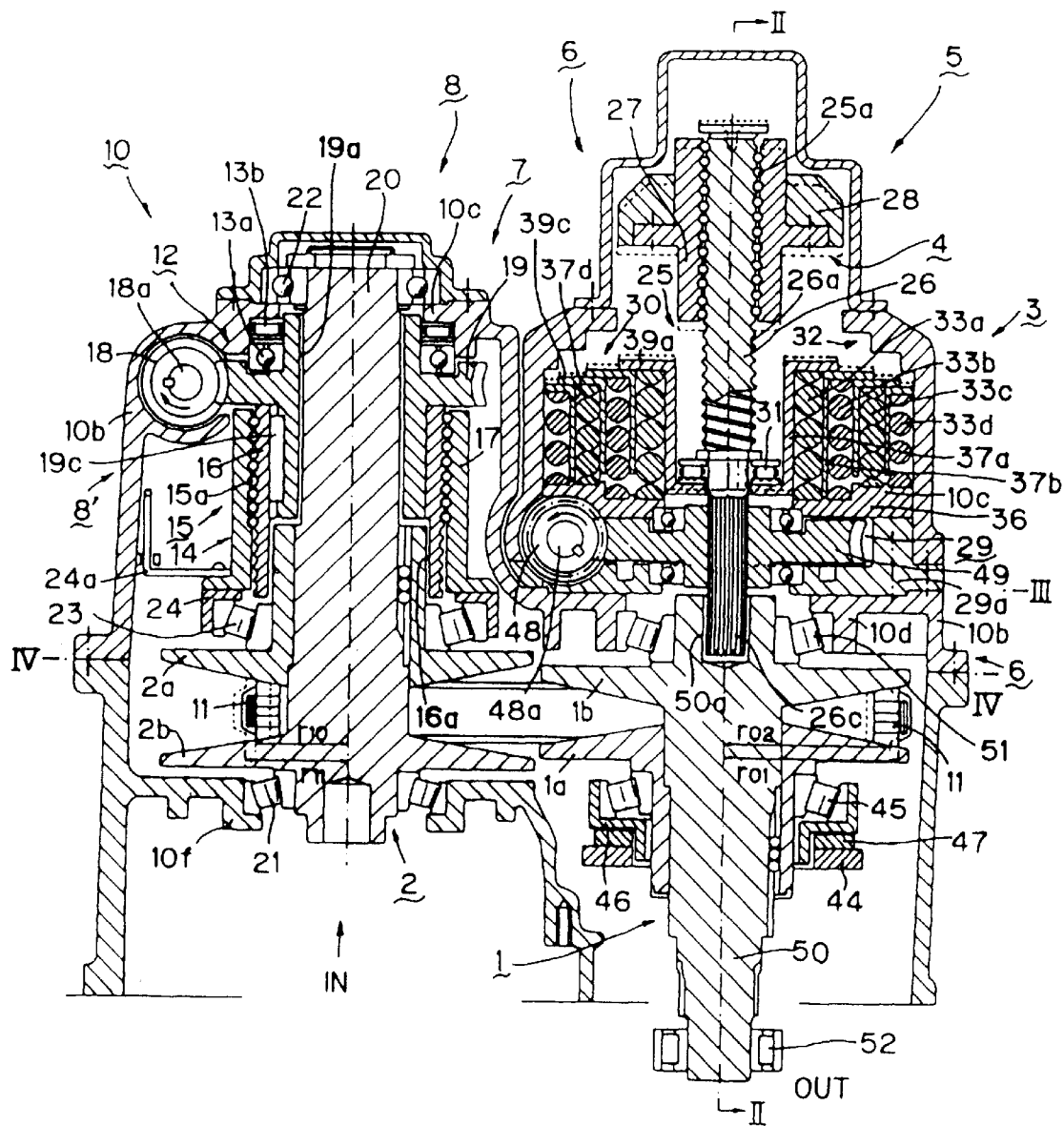
FIG. 1 is a cross-sectional view of a continuously variable speed drive for vehicle using a transmission wheel pressurizing apparatus according to a first embodiment of the present invention.

DESCRIPTION OF THE PREFERRED EMBODIMENTS (First Embodiment)

FIGS. 1 to 4 show, in a transmission wheel pressurizing apparatus according to a first embodiment of the present invention, the construction of parts of a continuously variable speed drive applied to a variable speed transmission device in which a transmission member is extended over a driving and a driven transmission wheels, and the characteristics of the pressurizing apparatus. A transmission 10 is constituted, as a basic constitution, by a variable speed transmission device formed from a second (driving) transmission wheel or a driving wheel 2, a first (driven) transmission wheel or a driven wheel 1, and a transmission member 11 extended between both said transmission wheels, and a variable speed control device 7 formed from a driven operating unit 6 on the driven wheel 1 side, a main operating unit 8 on the driving wheel 2 side, and a shared driving source 9 for synchronously driving both the operating units 6 and 8. The driving operating unit 8 has a second pressurizing apparatus 8' which has biased an expansion/contraction device 14 comprising a bias device 12 and a sliding device 15 from the driving source 9. The driven operating unit 6 biases, by the driving source 9, a first pressurizing apparatus 5 constituted by an elastic device 3 and a compression device 4 for compressing the former. The compression device 4 comprises a sliding device 25 and a biasing device 29 for driving the transmission wheel 1 and the elastic device 3. The transmission wheel pressurizing apparatus 7 of the present invention has the same meaning as a variable speed control device comprising a driving source 9 and a driven and driving operating units 6,8 having the pressurizing apparatuses 5 and 8' for variably press controlling the driven transmission wheel 1 and the driving transmission wheel 2, which will be described hereinafter in detail.

Either of the transmission wheels 1 and 2 has sliding disks 1a and 2a and fixed disks 1b and 2b arranged opposite to each other so that the former is slidable in an axial direction with respect to the latter through a key, the transmission wheels 1 and 2 being arranged reversely to each other. The balance of the pressurizing forces from the operating units 6 and 8 in both the transmission wheels 1 and 2 is controlled whereby a contact radius r relative to the transmission member 11 in both the transmission wheels 1 and 2 is continuously changed to achieve the power transmission of fixed horsepower in the whole speed change region. In the transmission member 11, a position of the maximum speed ratio is depicted in FIG. 1, and a position at 60% of the number of revolutions in which the left half is the radius r60 and the right half is the maximum radius r01, was depicted as a conventional compression-type belt for the convenience of explaining operation in FIG. 2. The transmission 10 forms a closed oil reservoir chamber from a body 10a and a lid 10b to constitute a wet type variable speed drive, and is connected to an internal combustion engine, a transmission device or the like of vehicles or the like. On the other hand, the whole variable speed control device 7 is concentrically arranged on the side of the lid 10b which is a part of the body 10.

The second pressurizing apparatus 8' of the driving operating unit 8 is constituted by the sliding device 15 as the expansion/contraction device 14 and the biasing device 12 comprising the driving transmission. The former comprises two sliding tools, i.e., a motion applying tool 16 and a motion receiving tool 17, those applied with a ball-thread press device 15a as a winding mechanism, and the latter is a worm transmission 12 supplied with variable speed instructions and comprising a worm 18 and a wheel 19. The pressurizing apparatus 8' is illustrated by the sliding device 15 composed of a rigid member for removing an unstable positioning factor such as an elastic force to accurately reproduce a reference position in variable diameter controlling. As shown in FIG. 1, the sliding device 15 is composed of a tubular wheel 19 and a tubular press device 15a, and the pressurizing apparatus 8' is provided with through-holes 16a and 19a through which a sliding shaft of the main transmission wheel 2 extends, so that they are juxtaposed to a position nearly equal in level to the pressurizing apparatus 5 of the driven operating unit 6 for intensive arrangement.

A driving shaft 20 is supported by both bearings 21 and 22 whereas the pressurizing apparatus 8' is pressed through bearings 13 and 23 between a body reference surface 10c and a transmission wheel 2. When the motion applying tool 16 is rotated by the wheel 19, the motion receiving tool 17 is not rotated but is pressed and slidably moved only in an axial direction by a guide rod 24a. Threads of the expansion/contraction device 14 are processed into right threads. Numeral 24 designates a motion applying device, which is illustrated, in this example, as a thrust receiver which acts as a pressure transmission device. Since an elastic member is not intervened in the pressurizing apparatus 8' in FIG. 1, the contact diameter r1 of the transmission member 11 is displaced and controlled directly merely by the pressurizing force without intervention of the elastic force from the body 10c to the sliding disk 2a.

Figure 2:
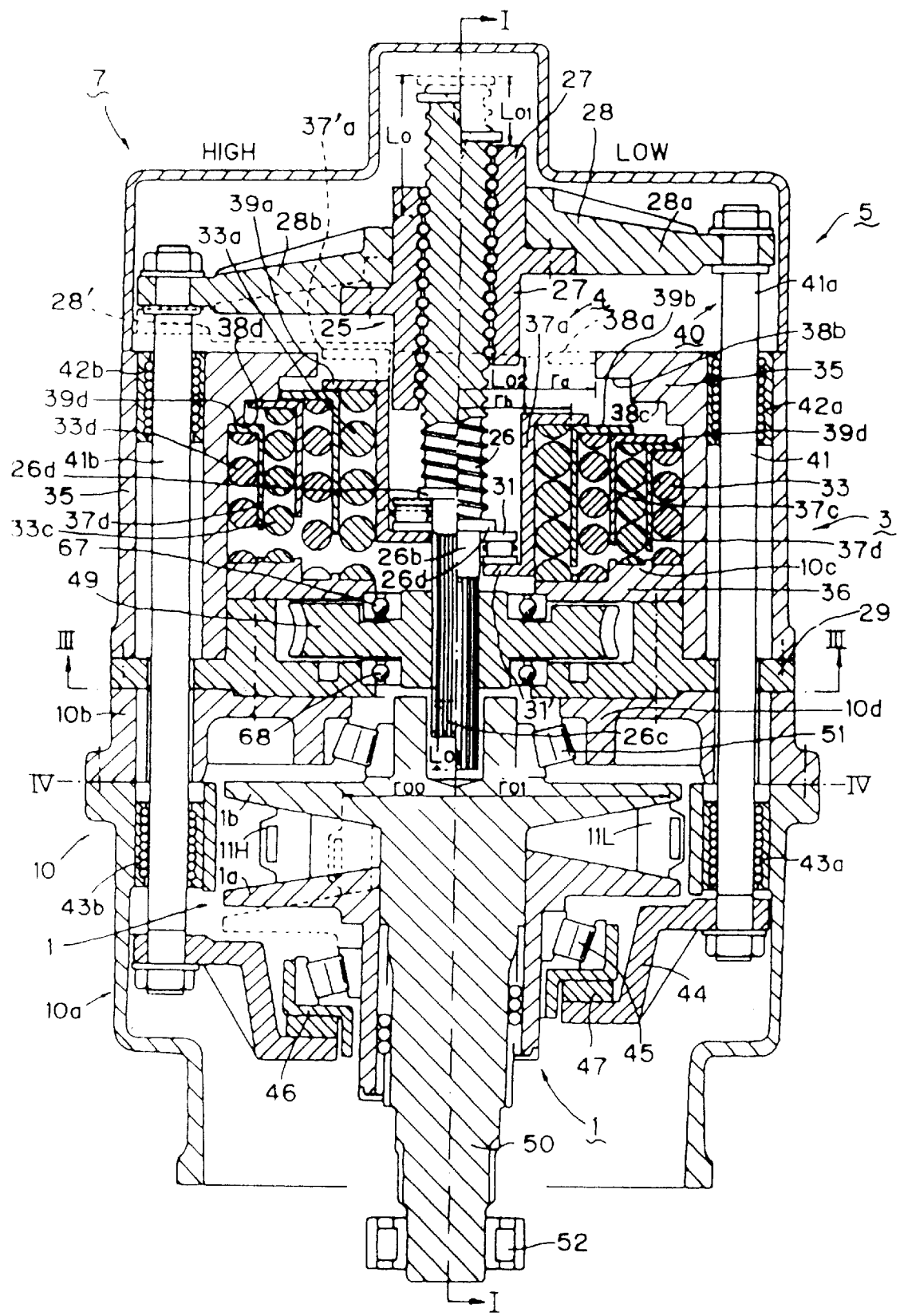
FIG. 2 is a longitudinal sectional view taken on line II—II of the continuously variable speed drive shown in FIG. 1.

The first pressurizing apparatus 5 of the driven operating unit 6 causes the sliding disk 1a to be pressed and slidably moved, despite of which it is not installed therearound but is installed in a non-rotational state on the lid 10b on the same plane side as the driving operating unit 8. In FIGS. 1 and 2, the first pressurizing apparatus 5 has, to left and right of a screw body 26, two transmission levers 41a, 41b, linear ball bearings 42, 43 and a shifter 44, and is connected to a pressure transmission device 40 for transmitting a pressurizing force via a gimbals 47, a thrust receiver 46, and a bearing 45 arranged in the transmission wheel 1. The pressurizing apparatus 5 internally comprises an elastic device 3 and a compression device 4 having the same function as the expansion/contraction device 14 as illustrated in an example in which pressurizing forces thereof are joined in series with each other with a bearing 31 as a joining point. The pressurizing force of the elastic device 3 is applied as a compression pressurizing force to the transmission wheel 1 via the compression device 4 and the transmission device 40 from the bearing 31 with a bottom lid 36 as the body reference surface 10c being a reference. The pressurizing apparatus 5 is detachably mounted, as a single structure 5 taken on line III—III of FIG. 2, on the lid 10b on the same axis as the transmission wheel 1.

The elastic device 3 is shown as an example in which a plurality of annular elastic members 33 are concentrically prestored in a fixed pressurizing state in a casing 35 to form a detachable single structure 30. A special construction is employed in order to secure a great pressurizing force within a narrow space that cannot be originally formed by a single elastic member. Four elastic members 33a to 33d are individually provided with annular motion applying members 37a to 37d applied with connecting portions 39a to 39d having one end and the other end engaged with the body 10 and the adjacent motion applying member respectively. Therefore, each elastic member is stably supported with the elastic force transmittable at one end and non-transmittable at the other end. The casing 35 is formed in its inner wall with three abutting portions with difference in level 38b to 38d and a sliding member 36, i.e., a bottom lid 36 as stop device 32 for the elastic member 33. In the present embodiment, there is provided no abutting portion 38a corresponding to a first-stage elastic member 33a because of being connected to the compression device 4 for selecting the minimum pressurizing force Pmin from the beginning in the initial pressurizing state. This can be arranged in advance as indicated by the dotted line 38a. Since the innermost diameter of each abutting portion with difference in level 38 is a diameter larger than the innermost diameter of each corresponding motion applying member 37, it projects from the abutting portion with difference in level 38 in the previous stage adjacent thereto. Accordingly, the motion applying tool 26 is guided, with the movement of the compression device, to each motion applying member in order of the motion applying members 37a to 37d to sequentially press the elastic members 33a, 33b, 33c and 33d to parallel add the pressurizing forces stepwise.

The compression device 4 has a sliding device 25 comprising a motion applying tool 26 and a receiving tool 27 applied with a ball-thread press device 25a, and a biasing device 29 in the form of a worm transmission supplied with variable speed instructions and comprising a worm 48 and a wheel 49 as an inversion preventing self lock mechanism, and an elastic device 3 is arranged therebetween. The motion applying tool 26 comprises a screw body portion 26a, a connecting portion 26b, a sliding portion 26c and a pressing portion 26d. The sliding portion 26c forms a spline shaft, receives only the rotating force between the former and the wheel 49 to transmit it to the screw body 26a and is slidably engaged in the axial direction. With this constitution, the compression device 4 is integrally incorporated with the elastic device 3 secured to the body 10 and is supported in a floating state and in a condition capable to transmit vibrations from the wheel relative to the elastic device 3. In the present embodiment, the ball threads applied to the motion applying tool 16 of the sliding device 15 of the main operating unit 8 are processed into the right threads, whereas the ball threads of the motion applying tool 26 of the driven operating unit 3 is processed into the left threads. The direction of the threaded groove can be changed as necessary. As shown in FIG. 2, the driven tool 27 is applied with a connecting lever 28 having two levers 28a and 28b and is connected to transmission means 41. Since the motion applying tool 26 of the winding sliding device 25 is supported in a floating state at two intermediate positions of an extreme end 31' of the motion applying member 37a and the transmission means 41 connected to the transmission wheel 1, the sliding portion 26c has a fixed length.

Figure 3A:
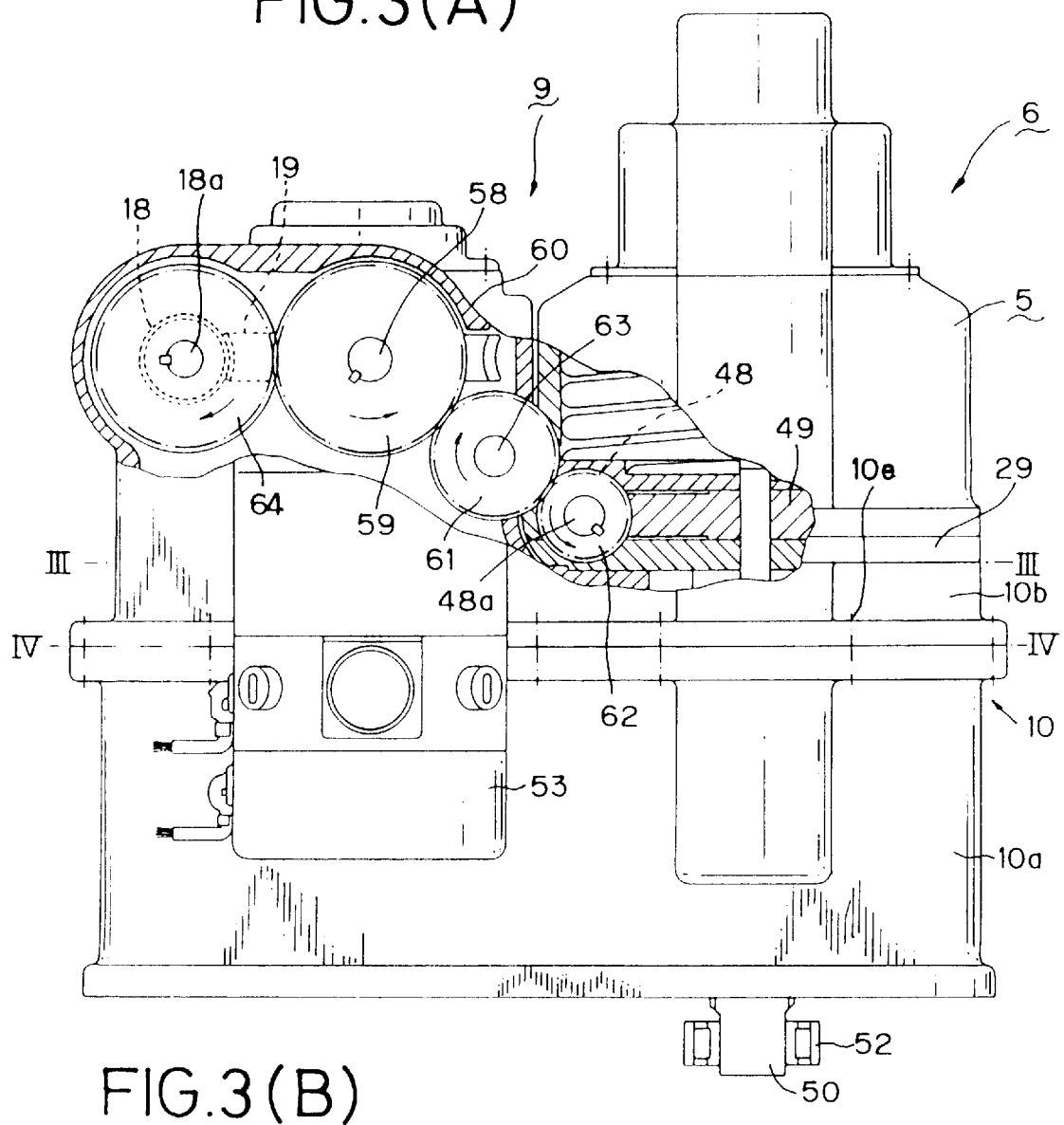
FIGS. 3A and 3B show a synchronous driving source of a part of an operating unit of the continuously variable speed drive shown in FIGS. 1, 2, 3A and 3B being partial sectional views showing the constitution of a second transmission and the constitution of a first transmission, respectively.
Figure 3B:
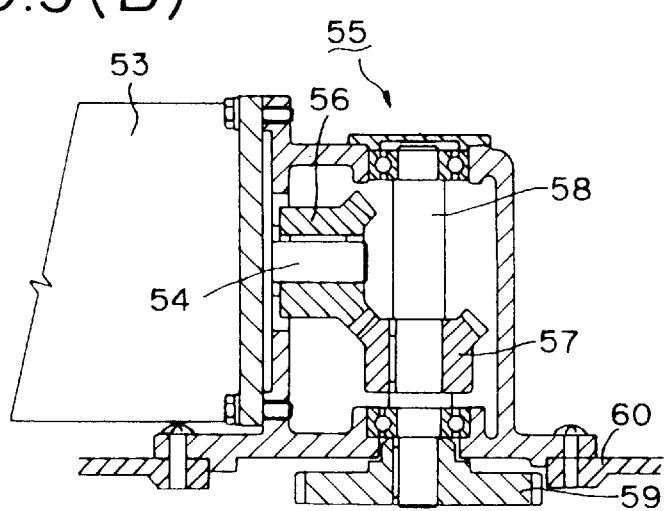

For the shared driving source 9, there is used a DC servo-motor as a reversible motor 53 with a brake shown in FIGS. 3A and 3B, which is applied with two of first and second transmissions 55 and 60 to simultaneously synchronously drive driving shafts 18a and 48a of the driving and driven operating units 8 and 3. Speed change power as shared variable speed instructions is transmitted from a shaft 54 to a shaft 58 via gears 56 and 57, from a shaft 58 to a shaft 18a by gears 59 and 64 in the operating unit 8, and from a shaft 58 to a shaft 48a via gears 59 and 62 in the operating unit 3 including an idler wheel 61 respectively. The difference in number of teeth between the gear 64 and the gears 63 and 62 is that a moving displacement L0 (=L01+L02) of the pressurizing apparatus 5 of the driven wheel 1 is larger than a moving displacement L1 of the sliding device 15 of the driving wheel 2 because both the sliding disk 1a and the elastic member 33 need be moved and pressed simultaneously. The pressurizing forces to both the transmission wheels 1 and 2 are such that when one is large, the other is small, thus a small capacity of a motor will suffice.

The operation of the transmission 10 will be described hereinafter with reference to FIG. 4 laying stress on the second and first pressurizing apparatuses 8' and 5. It is assumed that as shown in FIG. 1, the input and output shafts 20 and 50 are transmitted by the transmission 10 in the state that the transmission member 11 is in a position of maximum speed ratio and constantly rotated at a constant speed ratio. The reversible motor 53 starts to drive in a direction of reducing the speed ratio, that is, receiving instructions of increasing speed. As indicated by the arrow in FIG. 3A, power is transmitted to the shaft 18a and the shaft 48a so that they rotate reversely one another. Since in the present example, the threads 15a and the threads 25a as the press devices are processed reversely one another, when the sliding device 15 presses the disk 2a by an amount of movement $1_1$, the radius of the transmission member 11 starts to increase from r10 to r11. Simultaneously, the pressurizing apparatus 5 having pressed at the maximum pressurizing force Pmax operates in a direction of reducing the pressurizing force of the sliding device 25 of the compression device 4 by movement $1_0$ ($=1_{01}+1_{02}$). Accordingly, each motion applying member 37 of the full pressure pressurizing force to the elastic device 3 also rises up by movement $1_{02}$ to the position indicated by the dotted line, and at the same time the sliding tool 26 of the sliding device 25 moves up while the sliding tool 27 conversely moves down by the amount i.e., movement $1_{01}$ released from winding. This downward movement reduces the pressurizing force to the transmission wheel 1 via the lever 28 and the pressure transmission device 40 shown in FIG. 2 and at the same time, it is pulled by the pressurizing apparatus 8' on the side of the main wheel 2. As a result, the radius of the transmission member 11 of the transmission wheel 1 in FIG. 1 reduces from r01 to r02.

Figure 4:
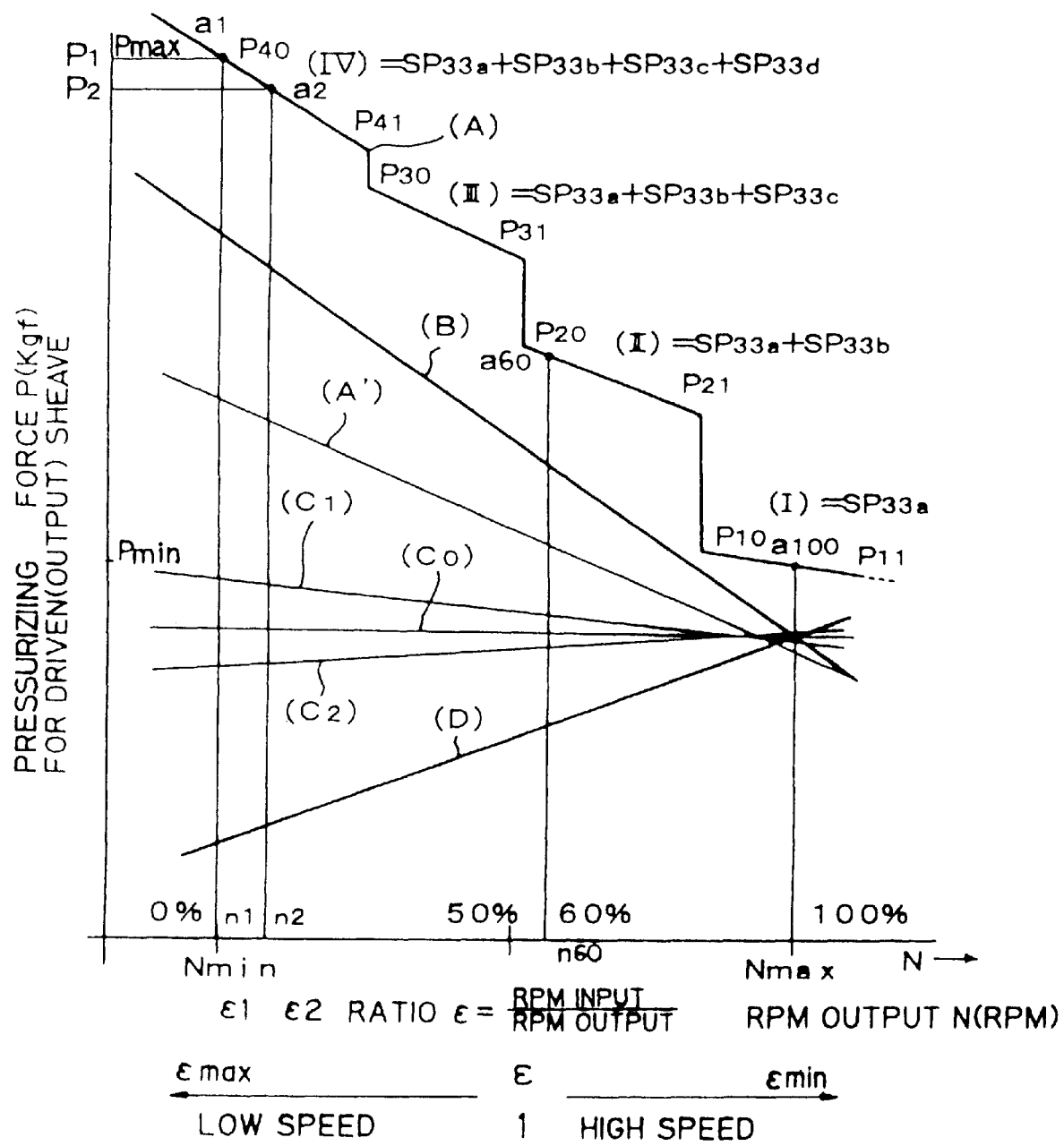
FIG. 4 is a characteristic view showing a relationship between a pressurizing force and the number of revolutions of the pressurizing apparatus according to the first embodiment.

This means that with the shift in the number of revolutions n1 to n2 from at the maximum speed ratio $\epsilon$max on the characteristic view of FIG. 4, shifting is made from the characteristic point a1 to a2 on the stepwise line (IV) of the characteristic (A), and at the same time, it indicates that the pressurizing force P1 to the transmission wheel 1 is also reduced to P2 as the speed increasing instructions is supplied. This indicates that the pressurizing force and the number of revolutions of the transmission wheel 1 are in inverse proportion to each other. Similarly, when the speed increasing instructions are further given from the reversible motor 53, the similar operation is repeated. Suppose, at the point where the number of output revolutions is approximately a half, i.e., n60, the elastic members 33c and 33d which abut on difference-in-level abutments 38c and 38d respectively as depicted in left half of FIG. 2 do not contribute to the pressurizing to the transmission wheel 1, and therefore, it is positioned at the characteristic point a60 of the staircase characteristic (II) and only the elastic members 33a and 33b are operated for pressurizing. Similarly to the above, as the driving tool 26 of the sliding device 25 rotates, the pressurizing characteristics reduce stepwise as the number of output revolutions increases and will reach the minimum pressurizing force Pmin at the maximum high-speed rotation. Conversely, in order to return to the deceleration state again, the reversible motor 54 is reversed by the speed decreasing instructions from the source 9 to thereby return to the original position in accordance with the operation reversed to that mentioned above.

In the aforementioned prior art elastic member, as the number of revolutions N of the driven wheel 1 increases, the pressurizing force also increases as shown in the characteristic line (D) of FIG. 4. On the other hand, the present invention is characterized in that while using the conventionally homogeneous elastic member which increases the compression pressurizing force when the compression amount increases, the elastic device 3 is cooperated with the compression device 4 whereby the characteristics between the pressurizing force and the number of revolutions are made in inverse proportion to one another to secure the negative inclined characteristics. Note that in substantially horizontal characteristic lines (C0 to C2), the pressurizing force per unit area is substantially the same in the whole variable speed region, but the contact area between the belt and sheave of the driven wheel 1 at the minimum speed reaches several times larger than that of the maximum. Accordingly, even with this characteristic, the axial torque T received by the transmission member 11 can increase reversely even when the number of revolutions N reduces. In the characteristic line (C2) of FIG. 4, even with a slight normal inclination, transmission of substantial constant HP can be made by an increased portion of contact area. In this application, "substantial inverse proportion" represents the conception including characteristics C2 with the slight normal inclination and further it also includes staircase or non-linear curve characteristics.

Next, the automatic aligning function of the transmission according to the present invention will be explained. Power transmission of the transmission is effected by an internal error factor and a variation factor from the outside, both of which hinders normal transmission. As typical examples, the former includes a longitudinal elongation of the transmission member 11 and a wear in width direction, and the latter includes a supply of variable speed instructions, an entry of a shock load from input/output apparatus on inlet and outlet sides. In either case, the elastic device 3 has a function of automatically compensating a factor of adverse influence and of automatically returning to a normal transmission operation. The elastic device 3 has a tension adjusting function absorbing and restraining an irregular confusion for a tension of the transmission member 11 issued in a process of the transmission operation and as a result, provides the automatic aligning function to assume into the stable transmission state for the radius and the pressurizing force in spite of the internal and external errors and disorders as complicated factors.

Assume now that an elongation of a circumferential length of the transmission member 11 gradually progresses during the operation at the maximum speed ratio $\epsilon 1$ (=$\epsilon$max). Since at this time the respective driving and driven operating units 8 and 6 are not biased, the contact radius in the driving wheel 2 remains as it is. However, in the driven wheel 1, the radius is enlarged according to an elongated portion. The number of output revolutions is reduced by that portion, and the disk 1a as well as the elastic device 3 slightly moves, but the pulley holding pressure P merely involves a slight change, and the holding pressure to the transmission member 11 keeps maintaining the state of the substantially maximum load. This indicates that even if the number of revolutions is changed slightly, the transmission function itself to transmit HP does not at all receive an obstacle and accomplishes automatic aligning to keep maintaining the normal transmission. A discussion will be made hereinafter of the case where the transmission member 11 reduces its thickness due to the wear of widthwise thereof. At this time, the operating units 6 and 8 are stopped, however, the contact radius in the driving wheel 2 is automatically reduced due to the pressing of the elastic device 3 in the driven wheel 1. And at the same time, in the driven wheel 1, the radius is similarly enlarged by that portion, thus slightly reducing the number of output revolutions, but performing automatic aligning while maintaining the normal transmission HP.

Further, a consideration is made of an entry of unexpected shock vibrations into the input and output shafts 20 and 50. Also in this case, automatic aligning function similarly acts. On the side of the driven transmission wheel 1, disordered vibrations upon enlargement or reduction of the radius r0 of the transmission member 11 occurs merely momentarily, but the vibrations are conversely transmitted from the pressure transmission device 40 to the compression device 4. At this time, in the compression device 4, it is transmitted from the receiving tool 27 to the applying tool 26, but since the spline sliding shaft 26c at the tip of the applying tool 26 is also axially slidably engaged with the wheel 49 of the biasing device 29, the compression device 4 is totally arranged in a floating state except it engages with the connector 32 of the applying member 37 of the elastic device 3. Accordingly, the disordered vibrations entered are elastically absorbed by the mere elastic device 3 directly. The disorder is then terminated in a short period of time and the pressurizing apparatus 5 again automatically returns to the original stable transmission state.

Next, a reason will be described that the pressurizing apparatus 5 of the driven wheel 1 supplies both variable pressurizing force and elastic force as indirect pressurizing to the transmission wheel, whereas the pressurizing apparatus 8' of the driving wheel 2 supplies only the variable pressurizing force as direct pressurizing to the transmission wheel. The reason is that the driven wheel 1 and the driving wheel 2 divide the functional parts of the transmission wheels 1 and 2 as the stepless continuous transmission. That is, the driven wheel 1 secures the axial torque for transmission of fixed HP with respect to the load device connected thereto, and also has the automatic aligning function of a elastic body returning to the stable state for itself with respect to internal and external disorders, whereas the driving wheel 2 always carries out the number of revolutions control function by way of positioning the disk 2a for backing up the respective parts of the driven wheel 1. This is because the driving wheel 2 operates as a reference wheel of the number of revolutions of the variable speed transmission, and the driven wheel 1 is caused to fulfill a function of a follower wheel which responds to the number of revolutions of the reference wheel for operation.

The pressurizing apparatus 5 of the driven transmission wheel 1 has the elastic device 3 integrally mounted between the biasing unit 29 and the sliding device 25 of the compression device 4 to constitute a mass-like single structure as a whole, and is arranged coaxial with the shaft 50 of the transmission wheel 1 on the outside of the lid 10a which is a part of the main body 10 and detachably from the line III—III of the outside. On the other hand, the pressurizing apparatus 8 of the driving transmission wheel 2 has the expanding and contracting device 14 composed of the sliding device 15 and the biasing unit 12 integrally mounted internally of the lid 10b together with the lid 10b. Accordingly, by releasing a number of bolts 10e from the main body 10a shown in FIG. 3A, the entire pressurizing apparatuses 6 and 8' constituting transmission wheel pressurizing apparatus 7 can be detached as the integral transmission with respect to the lid 10b as the main body 10 from the bearings 21, 45 and 52 together with the driven and driving transmission wheels 1 and 2 with the line IV—IV as a boundary. Note that the tip of the threaded shaft 26 is free from connection with the shaft 50, but the aperture 50a is provided to prevent abutment, and the former is separated therefrom and constituted to be detachable.

(Second Embodiment)

FIG. 5 shows a sectional constitution of a second embodiment according to the present invention used for a continuously variable speed device for machine tools such as a milling machine, a drilling machine and the like. The first pressurizing apparatus 5 of the present invention is applied to the driven transmission wheel 1 on the left side. Since all the forms of embodiments after the present embodiment are substantially the same in basic operation and function, the same reference numerals as those of the aforementioned first embodiment are used for the same parts, and only the main difference will be explained. The first difference is that a screw shaft 26' of a biasing device 29 of a compression device 4 extends through a coaxial through-hole 65 provided on a rotational shaft 50 of the transmission wheel 1 to perform the function of a pressure transmission device 40 with respect to a sliding disk la. The second difference is that in the compression device 4, a sliding device 25 is divided into two, a first sliding device 25c for driving the transmission wheel 1 by a variable speed sliding portion L01, and a second sliding device 25b for driving a compression moving portion L02 of the elastic device 3 to form a first and a second compression devices 4c and 4b, respectively, which are disposed on the face and the back of the transmission wheel 1 while sharing the screw shaft 26' and the biasing device 29. Moreover, in the screw shaft 26', threaded grooves of two threaded members 26a and 26b are processed in reverse threads pressurizing each other, with which are respectively meshed with the sliding tools 26 and 27. Accordingly, as depicted individually to left and right in FIG. 5, since upon pressurizing the elastic device, the disk 1a of the transmission wheel 1 is also pressed, the pressurizing characteristic to the transmission wheel 1 is the same as the characteristic line (A) of FIG. 4. While the rotational shaft 50 is supported by bearings into overhung holding structure, an idea of the present embodiment can be also applied to the construction of being supported by bearings on both sides of a rotary shaft as in the first embodiment. The third difference is that the motion applying member 37 of the elastic device 3 is biased by the sliding member 26 of the sliding device 25b. The forth difference is that the biasing device 29 composed of a pressure transmission device 40 of the screw member 26' and a worm transmission 29 is constituted in a single construction.

(Third Embodiment)

In the third embodiment shown in FIG. 6A, all of the elastic device 3 and the compression device 4 in the second embodiment shown in FIG. 5 are arranged in the lid 10b which is a part of the body 10 on the side of the sliding disk 1a of the transmission wheel 1. Also in this case, the operating function of the first pressurizing apparatus 5 of the transmission wheel 1 is substantially similar to that of the second embodiment. Main differences other than those mentioned above are that firstly, the elastic member is single; secondly, the pressure transmission means 40 is used both as the motion applying means 28' and the screw 26' of the compression device 4; and thirdly, when the lid 10b is removed from the body 10, the bearing 45 and the motion applying device 28 can be separated, and the elastic device 3, the compression device 4 and the pressurizing apparatus 5 can be detached from the body 10 as an integral structure, contributing to replacement and maintenance of a belt.

(Fourth Embodiment)

In the embodiment shown in FIG. 6B, only the elastic device 3 in the second embodiment shown in FIG. 5 is directly installed, being rotatably together with the transmission wheel 1. In this case, the difference in the fourth embodiment from the embodiments shown in FIGS. 1 and 5 other than those stated above is firstly that the casing 35 is directly mounted on the transmission wheel 1, and the disk 1a itself forms a part of the casing 35 to serve as a sliding member 36. The simultaneous driving by a single spring or a plurality of springs may be employed rather than the sequential driving by a plurality of springs. With use of plate springs, the dynamic balance can be easily secured. Secondly, the response member of the elastic device 3 is divided into five sliding members 37 operatively connected with a plurality of motion applying members, the motion applying means 28 on the compression device 4 side is used also as the sliding tool 27 of the winding sliding device 25, and a bearing is disposed between the sliding tool 27 and the motion applying member 37a. It is noted that the bearing 45 can be disposed between the disk 1a and the elastic member 33. The operation of the pressurizing apparatus 5 is similar to the embodiment shown in FIG. 1. Further, the biasing device 29 of the compression device 4 is also a known commercially available worm transmission which is the same as those shown in FIGS. 5 and 6A, details of which are therefore omitted.

(Fifth Embodiment)

The fifth embodiment shown in FIG. 7A shows an example of the first pressurizing apparatus 5 for the transmission wheel 1 which is supported by bearings at both ends of the shaft similar to the embodiment shown in FIG. 1. The main difference from the other embodiments is first that a plurality of elastic members 33 concentrically arranged in parallel are always simultaneously compressed by the compression device 4. Being different from the embodiments shown in FIGS. 1, 5 and 6, the pressurizing characteristics are not stepwise but linear characteristics are obtained as shown in the characteristic line (A') of FIG. 4. The elastic members 33a, 33b and the elastic member 33c are prepared by a clockwise spring and a counterclockwise spring to offset a compression strain relative to the bearing 45 for indirect arrangement to the sliding tool 27. Secondly, the casing 35 is formed by sharing the input-side sliding member 37 and the output-side sliding member 36 in one, the stop device 32 is provided, and the whole structure is constituted in a floating state and detachably. Thirdly, the biasing device 29 is constituted by a bevel transmission instead of a worm transmission. Fourthly, the whole pressurizing apparatus 5 comprising the compression device 4 and the elastic device 3 is formed with a cylindrical through-hole, through which a rotational shaft 50 extends to support.

(Sixth Embodiment)

The embodiment shown in FIG. 7B provides the direct pressurizing by the elastic member 33 similar to the embodiment shown in FIG. 6B. The difference in sixth embodiment from the other embodiments other than those stated above is that the sliding tool 26 of the sliding device 25 of the compression device 4 horizontally moves on the body 10a, and the sliding tool 27 which is commonly used as the pressure transmission means 40 presses vertically. In this case, the press device 25a has cam inclined joining surfaces 26c and 27c, so that the sliding tool 26, the bearing 45 and the sliding tool 27 can be slidably moved in a direction at right angles to each other, and the elastic device 3 is compressed and pressed by horizontal/vertical conversion sliding of both the cams. Further, in the present embodiment, the biasing device 29 comprises a winding device comprising screw members 48 and 49.

(Other Embodiments)

The present invention depends on the indirect pressurizing system by the elastic member instead of the direct pressurizing system by oil pressure. "Direct" termed herein means only a supply of pressurizing force, and "Indirect" means a simultaneous supply of both pressurizing force and elastic force. Accordingly, while in the present specification, a description has been made that a driving source of a variable speed control portion is an electric reversible motor, it is to be noted that the invention is not limited thereto, but various motors such as a fluid motor using oil pressure can be employed, individually disposed to every operating unit or simplified for sharing. The sliding devices 15 and 25 can be constituted by non-rotational hydraulic cylinders, however, if a winding device by a screw member such as ball threads, trapezoidal threads or the like is used for the sliding devices and pressurizing apparatus of the expansion/contraction device or compression device, there can be realized that large capacity transmission is subjected to variable speed control at high-speeds. Further, the driving operating unit 8 can be installed at a remote position via the pressure transmission device 40 from the driving wheel 2. Further, one or both of driving and driven operating units can be formed with a through-hole through which a rotational shaft extends. Conversely, the inside diameter of the through-hole 19a of the wheel 19 shown in FIG. 1 is changed in design so as to be larger than the outside diameter of an outer race of the bearing 22 whereby only the second pressurizing apparatus 8' is separated from the driving wheel 2, so that it can be singly mounted and removed. Accordingly, various changes and deformations according to the design specification within the range that those skilled in art can readily create from "Claims" are included in the scope of right of the present invention.

The present invention has the following effects:

The value common to the present invention resides in realization that variable press control of the transmission wheel does not depend on the direct pressurizing system by oil pressure but depends on the indirect pressurizing system by the elastic body, whereby not only the pressurizing force is merely applied to the first transmission wheel but the pressurizing force and the elastic force are simultaneously and always stably applied thereto. That is, in the prior art transmission wheel pressurizing apparatus, operation can be merely made when the pressurizing force of the elastic device is in direct proportional to the number of revolutions, whereas in the present invention, the compression device is provided in series to render the pressurizing operation in inverse proportion possible. The reason why this brings forth a decisive meaning in the continuously variable speed drive of the constant horsepower transmission type is that not only the point in which variable pressurizing force of ideal characteristics is merely supplied stably to achieve the constant horsepower transmission but also the variable speed drive can simultaneously achieve the automatic aligning function with respect to internal and external error factors of the variable speed drive of this kind. Particularly, if error factors such as change in oil temperature, outflow of oil, deterioration in response caused by valve control and the like in the related art hydraulic control are repetitively detected and executed with circuit compensation individually on all such occasions, the control itself becomes extremely cumbersome to render the speed change itself of high-speed response actually impossible and valueless. On the other hand, in the present invention, the major part thereof is compensated for by the automatic aligning function of the pressurizing apparatus to always automatically return to an original stable transmission state. This also means that the ideal high-speed response corresponding to the sudden start and sudden stop of vehicles or the like is realized.

In case of an elastic member not depending on oil pressure, an elastic material having an extremely large dimension and weight is indispensable. When this is rotated at high-speeds together with the transmission wheel as in the prior art, the stable rotation of the transmission wheel itself cannot be realized due to the deterioration of dynamic balance. So, if a heavy article such as an elastic device is secured to the body, and others are placed in a floating state, a supply of the elastic force to the transmission wheel is always assured.

It is possible to avoid incorporating an extremely large heavy article such as an elastic device together with the transmission wheel, a bearing is not deteriorated in a short period of time due to the deterioration of rotational dynamic balance. There can be arranged that the pressurizing apparatus itself is away from the periphery of the transmission wheel and cooperated with the transmission wheel in a non-rotational state at a suitable position of the body, and the workability such as replacement and maintenance of expendable supplies such as a belt, a sheave and the like and mass production properties are materially enhanced. Particularly, by releasing the periphery of the transmission wheel, it is advantageously utilized as the space for the heat radiating measures or the enhancement of durability of the transmission wheel itself.

Particularly, in the continuously variable speed drive, the pressurizing apparatus is indispensable to not only the driven wheel, but also the main driving wheel. When the elastic force is applied to the driven wheel and the main driving wheel is subject to press control except the elastic force, the stable transmission can be accomplished, and also both are completely synchronized so that both pressurizing apparatuses can be biased by a shared single driving source, thus enabling securement of high-speed response properties of speed change control corresponding to sudden start and sudden stop of vehicles or the like. When both the pressurizing apparatuses are concentrically arranged in one and the same plane as variable speed control devices, not only synchronization but mass production properties and readiness of maintenance management are further enhanced. Particularly, the driven transmission wheel pressurizing apparatus can be detachably mounted as a single assembly and the variable speed control device can be detachably mounted on the body integrally as a whole, that is an ideal construction in terms of assembly and disassembly operation. At the same time, ball threads are used for the expansion/contraction device or/and compression device to realize the high efficiency on the side of the variable speed control device and the variable speed control with high-speed response.

Further, the elastic member having a large length dimension and a heavy weight is extremely cumbersome in handling. Work such that the elastic member is released into a non-pressurizing state each time for maintenance including disassembly and assembly which take place periodically is accompanied by danger and cumbersome, which is actually impossible in site. However, if the elastic member is housed in advance in a pressurizing state into a single casing to constitute a single construction as a huge energy storing box, such a danger is released, and the operatability of the variable speed control system and the mass production properties are materially enhanced.

Particularly, the single elastic member is so long in dimension in the expansion direction so that it cannot be arranged in a narrow space. However, the elastic member is made not to be single but divided into a plurality of elastic members, which are juxtaposed, the elastic members are subjected to parallel simultaneous pressurizing or parallel sequential pressurizing, and the elastic members are pressed and stored into the single casing whereby even a small size, an extremely large elastic force or pressurizing force can be secured. There is a further merit that the safety factor can be suitably applied between the pressurizing characteristic A of FIG. 4 and the characteristic B on the actual load side to contribute to the power transmission with high efficiency on the side of the transmission portion.

What is claimed is:

1. A transmission wheel pressurizing apparatus in which a transmission wheel comprises a movable wheel and a fixed wheel, said movable wheel sandwiches a transmission body between said movable wheel and said fixed wheel and is always biased in a pressurizing state toward said fixed wheel by an elastic device to change pressurizing force according to variable speed pressurizing instructions supplied by a driving source and transmit power between said transmission wheel and said transmission body, comprising said elastic device having an elastic member supported to be capable of transmitting an elastic force at one end and not capable of transmitting an elastic force at the other end, said one end or said other end of said elastic member being compressibly operatively connected to a compression device, and said compression device for compressing and pressurizing said elastic device according to variable speed pressurizing instructions while inhibiting a discharge of said elastic force except between said transmission wheel and said elastic device, wherein said elastic device variably press-controls said transmission wheel while always applying the elastic force between said transmission wheel and said elastic device, in such a manner that the pressurizing force to said transmission wheel increases when the number of revolutions decreases and decreases when the same increases and is made substantially in inverse proportion to the number of revolutions by said compression device whereby the compression pressurizing force of said elastic device generated by superposing in series both pressurizing forces of said elastic device and said compression device is given between said transmission wheel and a body.

2. The transmission wheel pressurizing apparatus according to claim 1, wherein said compression device comprises a sliding device comprising two sliding tools and a pressing device, and a biasing device for biasing said sliding device.

3. The transmission wheel pressurizing apparatus according to claim 2, wherein in said compression device, said biasing device, said sliding device, or the combination of said biasing device and said sliding fulfill a self lock function for inhibiting a change of the compression pressurizing force of said elastic device by said elastic force of said elastic device.

4. The transmission wheel pressurizing apparatus according to claim 3, wherein in said compression device, said biasing device is constituted by a worm transmission machine.

5. The transmission wheel pressurizing apparatus according to claim 3, wherein said compression device causes the pressing device of said sliding device to come in engaging sliding by direct face contact of rigid members for removing a main cause of an unstable positioning.

6. The transmission wheel pressurizing apparatus according to claim 5, wherein in said compression device, said pressing device comprises an inclined cam for converting the motion of said two sliding tools from a horizontal driving to a vertical driving, respectively, and said biasing device comprises a winding device for pressurizing said inclined cam.

7. The transmission wheel pressurizing apparatus according to claim 5, wherein in said compression device, said pressing device, said biasing device, or both said pressing device and said biasing device are formed from a winding device having a screw member to drive said sliding device.

8. The transmission wheel pressurizing apparatus according to claim 7, wherein in said compression device, said pressing device comprises traveling nuts with internally threads to engage said sliding tool, and said biasing device comprises a gear transmission including a screw shaft with two external thread members reversed in thread to each other.

9. The transmission wheel pressurizing apparatus according to claim 8, wherein said compression device comprises a first compression device for obtaining a variable speed moving portion of said transmission wheel and a second compression device for obtaining a press moving portion of said elastic device, said first and second compression devices are synchronously biased.

10. The transmission wheel pressurizing apparatus according to claim 4, wherein in said compression device, said two sliding tools assemble to each other by way of threads in said pressing device, and one of said sliding tools presses the driven transmission wheel while the other presses said elastic device.

11. The transmission wheel pressurizing apparatus according to claim 10, wherein said compression device comprises a single compression device, which simultaneously compresses and presses both variable speed moving portion and a said press moving portion shared to said transmission wheel and elastic device respectively.

12. The transmission wheel pressurizing apparatus according to claim 11, wherein in said compression device, the pressing device of said sliding device is formed from a ball screw.

13. The transmission wheel pressurizing apparatus according to claim 1, wherein said compression device or said elastic device includes a pressure transmission device of a bearing or a transmission means, and pressurizes said transmission wheel though said pressure transmission device.

14. The transmission wheel pressurizing apparatus according to claim 13, wherein said elastic device is stably installed directly or indirectly through said pressure transmission device on said transmission wheel or said body.

15. A transmission wheel pressurizing apparatus in which a transmission wheel comprises a movable wheel and a fixed wheel, said movable wheel sandwiches a transmission body between said movable wheel and said fixed wheel and is always biased in a pressurizing state toward said fixed wheel by an elastic device to change the pressurizing force according to variable speed pressurizing instructions supplied by a driving source and to transmit power between said transmission wheel and said transmission body, said transmission wheel pressurizing apparatus comprising said elastic device having an elastic member supported to be capable of transmitting an elastic force at one end and not capable of transmitting an elastic force at the other end, said elastic member compressed and pressurized between two sliding members by a compression device, and said compression device having a sliding device slidably controlling the mutual distance between two sliding tools while inhibiting a discharge of said elastic force except between said transmission wheel and said elastic device, said elastic device and said compression device are connected through said sliding member and said two sliding tools in order to apply a compression pressurizing force of said elastic device generated by superposing in series both pressurizing forces of said elastic device and said compression device between said transmission wheel and a body, one of said elastic device or said compression device is mounted in a rotational or non-rotational state on said body while the other being supported in a floating state in such a manner that pressing force to said transmission wheel increases when the number of revolutions decreases and decreases when the same increases and is made substantially in inverse proportion to the number of revolutions by said compression device.

16. The transmission wheel pressurizing apparatus according to claim 15, wherein said elastic device is pressurized and supported directly or indirectly between said transmission wheel and said compression device, said compression device and said body inhibiting transmission of an elastic force.

17. The transmission wheel pressurizing apparatus according to claim 15, wherein said elastic device is pressurized and supported directly or indirectly between said body and said compression device, and said compression device mutually transmit an elastic force between said transmission wheel and said elastic device.

18. The transmission wheel pressurizing apparatus according to claim 15, wherein in said transmission wheel pressurizing apparatus, said elastic device is disposed between a biasing device and said sliding device of said compression device.

19. The transmission wheel pressurizing apparatus according to claim 15, wherein said compression device transmits a rotating force of variable speed instructions at a connecting portion between said sliding device and said biasing device, said sliding device can be slidably moved in an axial direction, and only the sliding device is supported in a floating state.

20. The transmission wheel pressurizing apparatus according to claim 15, wherein said elastic device forms a casing surrounding said elastic member by said sliding member, is disposed movably in a compression direction, and is applied with a stop device for pressurizing and storing said elastic member into said casing at a predetermined pressurizing value.

21. The transmission wheel pressurizing apparatus according to claim 15, wherein in said elastic device, said elastic member is held in a pressurizing state at a predetermined fixed pressurizing value in advance, so that said transmission wheel is supplied a variable pressurizing force within range of minimum compression value to maximum compression value, and said elastic device is composed as a detachable single structure of an energy package while keeping a pressure storing state in the casing.

22. The transmission wheel pressurizing apparatus according to claim 21, wherein said elastic device has a plurality of annular elastic members, and said elastic members are either all simultaneously biased or sequentially biased according to a pressurizing displacement of said compression device or said elastic members.

23. The transmission wheel pressurizing apparatus according to claim 22, wherein in said elastic device, said sliding member or said sliding tool of said compression device is applied with an abutting portion with difference in level, and said elastic members are arranged parallel to add a composite pressurizing force in such order determined by said abutting portion with difference in level.

24. The transmission wheel pressurizing apparatus according to claim 23, wherein in said elastic device, one of said sliding members is divided into a plurality of sliding members and is applied to said elastic member having a plurality of annular elastic members disposed concentrically circularly, and each of said plurality of sliding members corresponds with one of said plurality of annular elastic members and is operatively connected with the sliding member of an annular elastic member adjacent to its corresponding annular elastic member according to a pressurizing displacement to add in parallel compression pressurizing forces.

25. A transmission wheel pressurizing apparatus in which a transmission wheel comprises a movable wheel and a fixed wheel, said movable wheel sandwiches a transmission body between said movable wheel and said fixed wheel and is always biased in a pressurizing state toward said fixed wheel by an elastic device to change the pressurizing force according to variable speed pressurizing instructions supplied by a driving source and to transmit power between said transmission wheel and said transmission body, said transmission wheel pressurizing apparatus comprising said elastic device having an elastic member supported to be capable of transmitting an elastic force at one end and not capable of transmitting an elastic force at the other end, said elastic member being compressed and pressurized by said compression device between two sliding members, said compression device having a sliding device for inhibiting a discharge of the elastic force except between said transmission wheel and said elastic device to slidably adjust a mutual distance for compressing and pressurizing said elastic device according to variable speed instructions, and a pressure transmission device connected to and cooperated with said compression device or/and said elastic device to transmit a pressurizing force or an elastic force between said transmission wheel and a body, said elastic device or/and said compression device is/are mounted coaxial or non-coaxial with a rotational axis of said transmission wheel and in a non-rotational state at a suitable position of said body, and wherein provided with a pressure transmission device disposed among said elastic device, said compression device or a rotation separating bearing which is arranged coaxially with a rotational shaft of said transmission wheel, said elastic device variably press-controls said transmission wheel while always applying the elastic force between said transmission wheel and said elastic device in such a manner that the pressurizing force to said transmission wheel increases when the number of revolutions decreases and decreases when the same increases and is made substantially in inverse proportion to the number of revolutions by said compression device connected to said driving source and supplied variable speed pressurizing instructions, whereby the compression pressurizing force of said elastic device generated by superposing in series both pressurizing forces of said elastic device and said compression device is given between said transmission wheel and said body and said transmission wheel is allowed to be transmitted at a constant power.

26. The transmission wheel pressurizing apparatus according to claim 25, wherein said pressure transmission device transmits pressure or power according to variable speed instructions from the inside of said rotational shaft via a through-hole that is formed at a positioned coaxial with said rotational shaft.

27. The transmission wheel pressurizing apparatus according to claim 25, wherein said pressure transmission device transmits from the outside of said rotational shaft by a transmission lever from a sliding tool or a sliding member at a position not coaxial with the axis of said rotational shaft.

28. The transmission wheel pressurizing apparatus according to claim 25, wherein said pressure transmission device transmits from the outside of said transmission wheel by bearings and two parallel transmission levers extending laterally from said sliding tool or said sliding member at a position coaxial with said axis of said rotational shaft as an approximately center.

29. The transmission wheel pressurizing apparatus according to claim 25, wherein said driving source has a control motor provided with a transmission inhibiting means of overrun power in said compression device to automatically variably control said transmission wheel.

30. A transmission wheel pressurizing apparatus in which a first transmission wheel comprises a movable wheel and a fixed wheel, said movable wheel sandwiches a transmission body between said movable wheel and said fixed wheel and is always biased in a pressurizing state toward said fixed wheel by an elastic device to change the pressurizing force according to variable speed pressurizing instructions supplied by a driving source and to transmit power between said first transmission wheel and said transmission body, wherein:

a first pressurizing apparatus for applying between a first transmission wheel and a body a compression pressurizing force of an elastic device generated by superposing in series both pressurizing forces of the elastic device disposed capable of compressing an elastic member and a compression device for compressing and pressurizing said elastic member to indirectly variably press control said first transmission wheel according to speed change instructions, so that the pressurizing force to said first transmission wheel and the number of revolutions are in inverse proportion to each other; a second pressurizing apparatus for applying between a second transmission wheel and the body a pressurizing force of an expansion/contraction device having a sliding device for slidably adjusting a mutual distance of two sliding tools to indirectly variably slide and control according to variable speed instructions; said driving source connected to said first pressurizing apparatus and said second pressurizing apparatus to synchronously supply variable speed instructions thereto; and said first pressurizing apparatus applying a variable press control which always maintains an elastic force to said first transmission wheel to assure a constant horsepower transmission accompanied by an automatic aligning function, said second pressurizing apparatus applying a variable sliding control by a non-elastic force to said second transmission wheel to assure a reference positioning for controlling a variable number of revolutions.

31. The transmission wheel pressurizing apparatus according to claim 30, wherein said second pressurizing apparatus displaces by a first moving amount with a driving transmission wheel which is said second transmission wheel as a reference wheel, whereas said first pressurizing apparatus synchronously controls a displacement of a second moving amount with said driven transmission wheel which is said first transmission wheel as a follower wheel and a displacement of a third moving amount for compressing and control said elastic device.

32. The transmission wheel pressurizing apparatus according to claim 31, wherein the whole or part of one pressurizing apparatus is disposed at the same plane of said body on the side in which the other pressurizing apparatus is arranged, and thereby one of said first or second pressurizing apparatuses press-controls said driven or driving transmission wheel respectively via a pressure transmission device arranged between said body and said driven or driving transmission wheel operatively connected to said one of said first or second pressurizing apparatuses.

33. The transmission wheel pressurizing apparatus according to claim 32, wherein the first or second pressurizing apparatus has a through-hole formed annularly to dispose said driven or driving transmission wheel therethrough.

34. The transmission wheel pressurizing apparatus according to claim 32, wherein the first or second pressurizing apparatus includes a pressure transmission device to apply the pressurizing force to said driven or driving transmission wheel therethrough between one plane and the other plane of said body.

35. The transmission wheel pressurizing apparatus according to claim 34, wherein the first and second pressurizing apparatuses are installed on the second body detachable from the first body, accommodating therein an input and output device connected to said both transmission wheels, and are mounted on said second body integrally with said both transmission wheel inside and with said both pressurizing apparatuses outside.

36. The transmission wheel pressurizing apparatus according to claim 30, wherein in said first and second pressurizing apparatuses, said compression device and expansion/contraction apparatuses are provided with worm transmissions, respectively, and said driving source is provided with transmission preventing means for an overrun power portion of a control motor, and an error transmission of variable speed instructions is prevented mutually between three elements, said driven and driving transmission wheels and said single driving source.

37. The transmission wheel pressurizing apparatus according to claim 30, wherein said driving source has a first transmission for receiving shared speed change instructions from said control motor, and a second transmission for branching and supplying the speed change instructions of said first transmission to said first and second pressurizing apparatus and connecting therebetween.

38. The transmission wheel pressurizing apparatus according to claim 30, wherein said driving source has a control motor individually every said first and second pressurizing apparatuses.

39. The transmission wheel pressurizing apparatus according to claims 37, wherein said transmission pressurizing apparatus is a variable speed control device of a constant horsepower continuously variable transmission for vehicles.

* * * * *